(12) United States Patent
Karlsson (10) Patent No.: US 7,835,939 B1
(45) Date of Patent: Nov. 16, 2010

(54) SYSTEMS AND METHODS FOR PREDICTING ADVERTISING REVENUE

(75) Inventor: Niklas Karlsson, Mountain View, CA (US)

(73) Assignee: AOL Advertising Inc., Baltimore, MD (US)

(*) Notice: Subject to any disclaimer, the term of this patent is extended or adjusted under 35 U.S.C. 154(b) by 408 days.

(21) Appl. No.: 11/979,098

(22) Filed: Oct. 31, 2007

(51) Int. Cl.
*G06F 17/00* (2006.01)

(52) U.S. Cl. ........................................ 705/10

(58) Field of Classification Search ............ 705/10
See application file for complete search history.

(56) References Cited

U.S. PATENT DOCUMENTS

| | | | |
|---|---|---|---|
| 5,227,874 A | 7/1993 | Von Kohorn | |
| 5,446,919 A | 8/1995 | Wilkins | |
| 6,006,197 A * | 12/1999 | d'Eon et al. | 705/10 |
| 7,039,599 B2 * | 5/2006 | Merriman et al. | 705/14.52 |
| 7,212,974 B2 | 5/2007 | Kilbank | |
| 2003/0033405 A1 | 2/2003 | Perdon et al. | |
| 2003/0225738 A1 * | 12/2003 | Ternoey et al. | 707/1 |
| 2005/0086605 A1 | 4/2005 | Ferrer et al. | |
| 2005/0096950 A1 | 5/2005 | Caplan et al. | |
| 2006/0085419 A1 | 4/2006 | Rosen | |
| 2006/0122879 A1 * | 6/2006 | O'Kelley | 705/14 |
| 2006/0224447 A1 | 10/2006 | Koningstein | |
| 2007/0027754 A1 | 2/2007 | Collins et al. | |
| 2007/0118425 A1 | 5/2007 | Yruski | |
| 2007/0244760 A1 | 10/2007 | Bodnar | |
| 2007/0261072 A1 | 11/2007 | Boulet et al. | |
| 2008/0052140 A1 | 2/2008 | Neal et al. | |
| 2009/0157442 A1 | 6/2009 | Tesler | |

OTHER PUBLICATIONS

Copending U.S. Appl. No. 11/907,587, filed Oct. 15, 2007, in the name of Niklas Karlsson, entitled "Revenue Smoothness Control."
Copending U.S. Appl. No. 11/979,096, filed Oct. 31, 2007, in the name of Niklas Karlsson, entitled "Pre-Shape Filter."
Colombo, Richard, "A Model for Diagnosing and Reducing Nonresponse Bias," Journal of Advertising Research, Jan.-Apr. 2000, p. 85 (1 page).

* cited by examiner

*Primary Examiner*—Thomas Dixon
(74) *Attorney, Agent, or Firm*—Finnegan, Henderson, Farabow, Garrett & Dunner, LLP (57) ABSTRACT

Methods and system are provided to predict data related to advertising. Predicted data may include impressions, clicks, actions, or other data related to the advertisement, such as the ratio of impressions to clicks or the ratio of clicks to actions. Methods for predicting revenue of an advertising campaign use a revenue predictor in a campaign control computer while the campaign is ongoing. Based on a starting point in time during the advertising campaign when a starting revenue and volume data through the starting point in time were known and a target point in time, a cumulative predicted revenue can be determined. Based on an estimated revenue generated by the advertising campaign from a time just after the starting point in time until a selected point in time and a predicted revenue from a time just after the selected point in time until the target point in time is computed, the cumulative predicted revenue for the advertising campaign through the target point in time is determined.

26 Claims, 5 Drawing Sheets

SYSTEMS AND METHODS FOR PREDICTING ADVERTISING REVENUE

DESCRIPTION OF THE INVENTION

1. Field of the Invention

This invention is generally related to advertising. This invention is more specifically related to predicting a revenue related to an advertising campaign.

2. Background of the Invention

Since the early 1990's, the number of people using the World Wide Web has grown at a substantial rate. As more users take advantage of the World Wide Web, they generate higher and higher volumes of traffic over the Internet. As the benefits of commercializing the Internet can be tremendous, businesses increasingly take advantage of this traffic by advertising their products or services on-line. These advertisements may appear in the form of, for example, leased advertising space (e.g., "banners") on websites or advertisements on digital television, which are comparable to rented billboard space in highways and cities or commercials broadcasted during television or radio programs.

Typically, a digital or online advertising campaign consists of an advertiser designing an advertising campaign for one or more products or services in order to target the campaign to individuals interested in the product or service. Generally, there are three events that occur in relation to viewing a digital or online advertising campaign. The first is an "impression." This occurs when an individual views an online advertisement. The second is a "click" which occurs when an individual selects or clicks on an advertisement. The third is an "action." This occurs when an individual takes an action, such as making a purchase or providing information to the advertiser as a result of viewing the advertisement.

The advertiser may hire a manager to place online advertisements during the advertising campaign. An advertiser may pay the manager based upon the number of events (e.g., impressions, click or conversions) related to an advertisement. The advertisements may be placed, for example, on websites, personal digital assistants, cell phones, digital televisions, etc. An advertiser may also pay a manager based upon the number of "deals." In certain embodiments, a deal is a combination of two or more events, such as, an impression-to-click, or a click-to-action.

Before users browse to a particular web page, there is much unknown to advertisers that might advertise on that page and to managers that may place advertisements on the companies' behalf. Neither the advertisers nor the managers know how many users will browse to particular web pages, and therefore do not know the volume of advertisements (the number of "impressions") they will be able to place. Further, neither is it known how many users will select or "click" on each advertisement or if "actions," e.g., sales or signing up new users, will result from each display or impression of an advertisement or what the ratio of, for example, clicks to actions may be.

SUMMARY OF THE EMBODIMENTS

Advertisers may be interested in impressions (e.g., if they are trying to increase awareness of a brand), clicks (e.g., if they are trying to provide more information about a product), or actions (e.g., if they are trying to make sales or get new users to sign up for services). Advertisers may pay, on the other hand, for impressions, clicks, and/or actions, regardless of their interests. Therefore, in addition to wanting to predict impressions, clicks, and actions, one may want to predict other data related to the advertisement, such as the ratio of impressions to clicks or the ratio of clicks to actions. The predictions of data related to advertisements may help advertisers, and those placing advertisements on their behalf, assess the potential value of an advertisement. Predicted revenue may also be used to adjust the behavior of an advertising campaign, during the campaign.

Embodiments of the present invention provide a method for predicting revenue of an advertising campaign using a revenue predictor in a campaign control computer while the campaign is ongoing. A starting point in time during the advertising campaign is received when a starting revenue and volume data through the starting point in time were known and a target point in time is determined, at which a cumulative predicted revenue is to be determined representing the cumulative revenue generated by the advertising campaign up to the target point in time. The time between the starting point and the target point is divided into at least two intervals based on a selected point in time at which less than all of revenue data and volume data were known. An estimated revenue generated by the advertising campaign from a time just after the starting point in time until the selected point in time is computed, and a predicted revenue generated by the advertising campaign from a time just after the selected point in time until the target point in time is computed. Further, the cumulative predicted revenue for the advertising campaign through the target point in time is determined based on the starting revenue, the estimated revenue, and the predicted revenue.

In another embodiment, a method is provided predicting revenue of an advertising campaign using a revenue predictor in a campaign control computer while the campaign is ongoing by receiving a starting point in time, during the advertising campaign, when a starting revenue, click volume data, impression volume data, and conversion volume data through the starting point in time were known. An estimated revenue for a portion of the advertising campaign from a time just after the starting point in time until a second point in time when click volume data, impression volume data, and conversion volume data were known but revenue data was not known is estimated. A probability-predicted revenue is predicted for a portion of the advertising campaign from a time just after the second point in time until a third point in time when click volume data and impression volume data were known but conversion volume data and revenue data were not known. A model-predicted revenue generated by the advertising campaign from a time just after the third point in time until a target point in time when click volume data, impression volume data, conversion volume data, and revenue data are not known is computed. Furthermore, a cumulative revenue for the advertising campaign through the target point in time is estimated by combining the starting revenue, the estimated revenue, the probability-predicted revenue, and the model-predicted revenue.

Other embodiments provide a system for predicting revenue of an advertising campaign while the campaign is ongoing including a campaign control computer and a revenue predictor. The campaign control computer is configured to produce a control signal to direct behavior of the advertising campaign. The revenue predictor is configured to receive a starting point in time, during the advertising campaign, when a starting revenue and volume data through the starting point in time were known and receive a target point in time, at which a cumulative predicted revenue is to be determined representing the cumulative revenue generated by the advertising campaign up to the target point in time. The revenue predictor is further configured to divide the time between the starting point and the target point into at least two intervals based on a selected point in time at which less than all of revenue data and volume data were known and compute an estimated revenue generated by the advertising campaign from a time just after the starting point in time until the selected point in time. Still further, the revenue predictor is configured to compute a predicted revenue generated by the advertising campaign from a time just after the selected point in time until the target point in time and determine the cumulative predicted revenue for the advertising campaign through the target point in time based on the starting revenue, the estimated revenue, and the predicted revenue.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Advertisers may create advertising campaigns that include many advertisements to be placed on websites during a specified period of time. For example, an automobile company may design several advertisements for a new model and may wish to have the advertisements placed during a three-week period around the launch of the new model. The advertiser may be interested in impressions (e.g., if the goal is to increase awareness of the automobile brand), clicks (e.g., if the goal is to provide more information about the new automobile model), or conversions (e.g., if the goal is to sell automobiles). The advertiser may pay based on, for example, impressions, clicks, or conversions over the course of the advertising campaign. The advertiser may have a spending plan that specifies how the advertiser wishes to spend its budget during a campaign. For example, the advertiser may wish to spend money only on certain days during the campaign, or may wish to spend evenly over every day of the campaign.

At the start of an advertising campaign, an advertiser may specify a number of requirements for a campaign in an insertion order (IO). The requirements of the IO may define, for example, the duration of the campaign, the total budget, the event or events (impression, click, or conversion) used to measure performance, constraints on the delivery of the ad, the cost of each event, the rate at which the budget is spent, etc. A computer program can be used to manage the campaign so that the performance of the advertising campaign matches the terms of the IO.

Online advertisements are placed using inventory segments. An inventory segment is a part of the available advertising space or time that the manager controls. For example, an inventory segment may include a geographic region, or users of a particular internet search engine. Some inventory segments are in greater demand than others, therefore these segments may cost more than others for an advertiser. Advertisers may bid for advertising slots on selected websites based on targeting a desired audience. Advertisers may also set other parameters, such as a maximum number of impressions. By adjusting these parameters, a control program can affect how the ad is placed and, therefore, how the advertising campaign performs.

To control the performance of an advertising campaign, a plant may be used to model the campaign. In certain embodiments, the input to the plant is one or more control signals, which may be for example a factor to scale the price of an event (i.e., an enhancement factor) or an adjustment to the bid price of the campaign. In these embodiments, the output of the plant contains volume and revenue data. Several models are proposed to describe the relationship between plant input and plant output and its internal dynamics. These models are used for control design analysis and simulation validation in online advertising systems.

Control signals may be used to adjust the actual behavior of a campaign so that it more closely matches a desired behavior of the advertising campaign, such as a requirement of the IO. Control signals may accelerate or decelerate the placement of the advertisements for a given campaign in order to control the revenue spent during the campaign. Since different campaigns may have a very different behavior, the control parameters associated with the proposed models may change significantly from one campaign to another. Furthermore, for a given campaign, its associated control parameters may also vary with time.

Feedback-Based Control System

Figure 1:
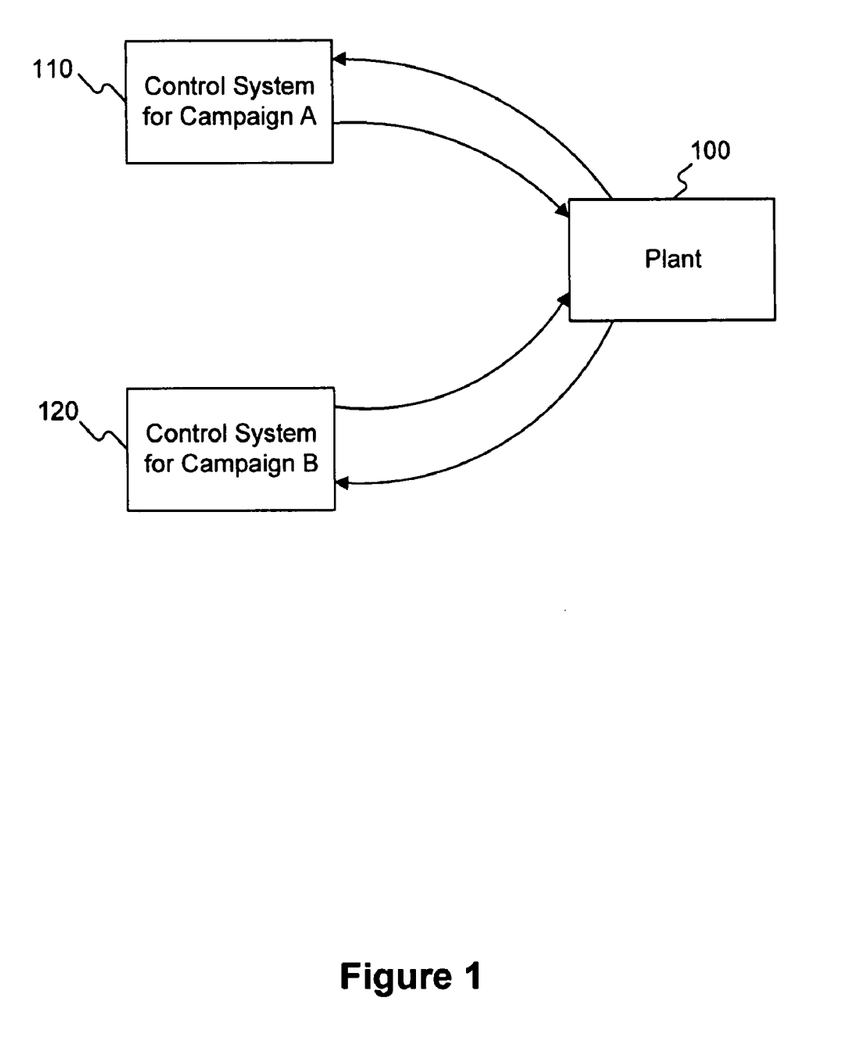
FIG. 1 is a block diagram of a system for predicting the revenue for an advertising campaign, consistent with embodiments of the present invention.

FIG. 1 shows an overview of a feedback system for campaign control consistent with an embodiment of the present invention. In the feedback system of FIG. 1, a plant 100 represents a system to be controlled and it consists of active advertising campaigns A and B. A control system for campaign A 110 and a control system for campaign B 120, are shown, though one skilled in the art will recognize that any number of campaigns can be managed in the feedback system of FIG. 1. Control systems 110 and 120 regulate campaign activities by sending control signals determined based on feedback information. The present invention can accommodate a plurality of advertising campaigns at one time. In the embodiment of FIG. 1, the feedback control system is depicted in a decentralized fashion. In other words, for an active campaign, a control system at the campaign level regulates this campaign's activities based on information about those activities. For the sake of clarity, the control system will now be discussed at the campaign level.

Figure 2:
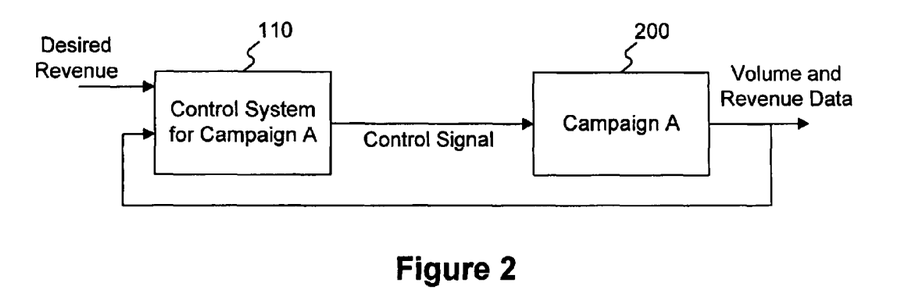
FIG. 2 is a block diagram showing a process for predicting the revenue of an advertising campaign, consistent with embodiments of the present invention.

FIG. 2 shows an example of part of the feedback system of FIG. 1 corresponding to advertising campaign A. A closed-loop system at the campaign level, as shown in FIG. 2, can be viewed as a connection between one campaign, e.g., campaign A 200 and its corresponding control system 110. The input to this closed-loop system is composed of one or more signals indicating a desired behavior of a campaign A 200. For example, the desired behavior may be a desired cumulative revenue to be generated from a particular campaign. The desired cumulative revenue may be, for example, revenue specified in the IO. The output of the closed-loop system may be, for example, volume and revenue data from campaign A 200. Feedback data is data about the actual behavior of the campaign for some period of time in the past. It may be, for example, the generated revenue of the campaign. With the input signal and feedback data, control system 110 generating a control signal to force campaign A 200 to behave more like the desired behavior as specified by the input signal.

Figure 3:
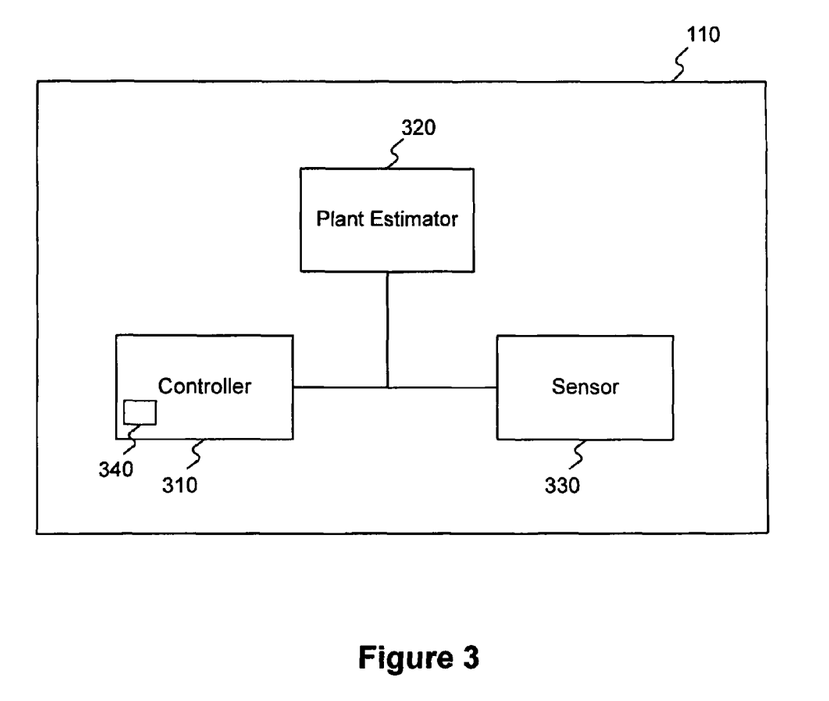
FIG. 3 is a diagram showing a process for predicting the revenue of an advertising campaign, consistent with embodiments of the present invention.

FIG. 3 is a block diagram of a campaign control system in greater detail, consistent with an embodiment of the present invention. As shown in FIG. 3, control system 110 includes a sensor 330, a plant estimator 320 and a controller 310. Sensor 330, controller 310, and plant estimator 320 may be implemented, for example, as computer components or software modules connected, for example, by a local area network, the Internet, or another communications network. In some embodiments, all of the components of control system 110 may reside on a common server computer.

Sensor 330 receives data about the advertising campaign in real time and computes measurements for feedback controller 310 and plant estimator 320. Some outputs of sensor 330 are volumes (e.g., impression, click, and action volumes) and revenue data. Plant estimator 320 and controller 310 rely on the quality of data generated by sensor 330. To send reliable measurements to controller 310 and plant estimator 320 as soon as possible, adaptive control system 110 may use an algorithm based on non-parametric latency (the sum of lag and delay) estimation.

Each campaign can be described by a mathematical model defined by a set of plant parameters representing certain aspects of the actual behavior of the advertising campaign. A fixed-gain controller 310 may not be able to consider changes in plant parameters. Such changes can be a result of a change in the number of users viewing the advertisements due to, for example, a change in the time of day or during a holiday period. A fixed-gain controller 310 may be unable to stabilize all the campaigns and deliver the desired performance, according to the control parameters.

An adaptive control system 110, which estimates the plant parameters in real time and tunes its control parameters to counteract the changes in plant parameters, is able to incorporate changes in plant parameters and deliver the desired performance.

Different campaigns possess different plant parameters, and the control parameters for a given campaign may also change with time. To deal with such a situation, plant estimator 320 estimates unknown plant parameters based on the plant input and outputs as reported by sensor 330. Plant estimator 320 provides reliable estimates for unknown parameters to feedback controller 440 so that controller 310 may predict the system behavior and tune its gains adaptively to achieve desired performance.

Controller 310 uses an algorithm to compute a control signal that makes plant 100 behave as prescribed by the reference signal fed into controller 310. To make control possible, control system 110 needs, in addition to the reference signal, a feedback signal (for example, the generated revenue of the campaign in budget control) reported by sensor 330 and the on-line plant parameter estimates provided by plant estimator 320. The feedback signal, together with the reference signal, tells controller 310 what the current tracking error is and in what trend the error moved in history. Controller 310 then robustly tunes the control parameters based on the plant parameter estimates. It generates a smooth control signal to push the tracking error towards zero.

Controller 310 may include a revenue predictor 340 to predict revenue of the advertising campaign in order to measure the behavior of the campaign. For example, revenue predictor 340 may use volume data (e.g., impression volume data received from sensor 330) and estimated plant parameters (e.g., an estimated conversion probability received from plant estimator 320) to predict revenue of the advertising campaign.

Figure 4:
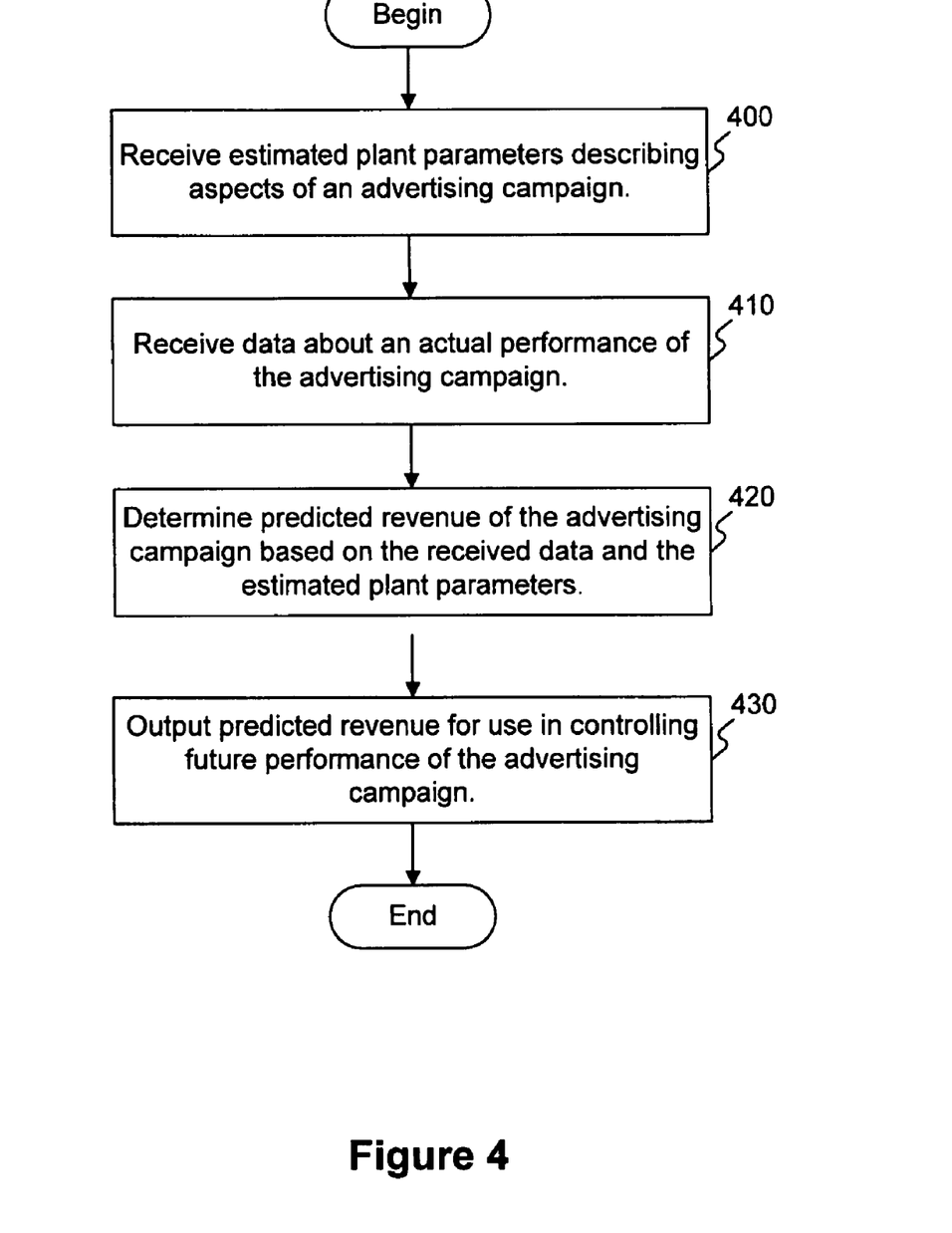
FIG. 4 is a flowchart of a process for predicting advertising revenue, consistent with certain embodiments of the present invention.

FIG. 4 is a flowchart of a process for predicting advertising revenue, consistent with certain embodiments of the present invention. A revenue predictor, such as revenue predictor 340, receives estimated plant parameters describing aspects of an advertising campaign (step 400). Plant parameters may be, for example, click volume parameters, impression volume parameters, and/or impression-to-conversion probability parameters estimated by plant estimator 320 to characterize the advertising campaign.

For example, if the campaign measures impressions, then the plant parameters will correspond to impression volume parameters. An impression volume parameter may be used to measure the number of impressions occurring in a given time period. If the campaign measures the number of clicks, then the plant parameters correspond to the click volume parameters. A click volume parameter may be used to indicate the number of clicks that will occur in a future time period. Additionally, if the campaign measures actions, then the plant parameters may include parameters such as: 1) action volume parameters, 2) impression volume parameters, and 3) impression-to-action probability parameters. Impression-to-action probability parameters may be used to determine the likelihood that an impression will eventually result in an action.

The revenue predictor also receives data about an actual performance of the advertising campaign (step 410), such as volume and revenue data collected in real time by sensor 330. More specifically, the data about a campaign's actual performance during a specific time period (such as an hour period) may include the revenue for an earlier time period, the measured revenue for the specific time period, volume data (e.g., impression volume or click volume) from an earlier time period, and the most recent control signal issued by controller 310 to control the advertising campaign. In certain embodiments, this data may be highly accurate estimates, rather than true values, provided by sensor 330.

Based on the estimated plant parameters and the data about the performance of the advertising campaign, the revenue predictor may determine predicted cumulative revenue of the advertising campaign (step 420), as described in greater detail below. Finally, the revenue predictor may output the predicted revenue for use in controlling future performance of the advertising campaign (step 430). For example, controller 310 may use the predicted revenue output by the revenue predictor as part of determining a control signal to adjust the behavior of the advertising campaign.

Revenue Prediction

During the course of an advertising campaign, data about the campaign's actual performance is collected, e.g., by sensor 330, in real time. Thus, as the campaign progresses, controller 310 receives data that may include actual revenue generated by the campaign (e.g., revenue through a certain point in time or revenue in a one hour period, etc.) and actual volume data (e.g., the number of impressions, clicks, and/or actions to date or by hour, etc.). However, during an ongoing campaign, there will be points in time when only some of this actual data is known (e.g., volume data is known, but not revenue data) or when none of the actual data is known (e.g., only probabilities or data models are available). In certain embodiments, as the point in time nears the present moment, less data will be known and more will have to be estimated. Nonetheless, revenue predictor 340 can closely predict an advertising campaign's revenue, even when actual data is partially or not available for some of the duration of the campaign using methods and systems consistent with the present invention.

Figure 5:
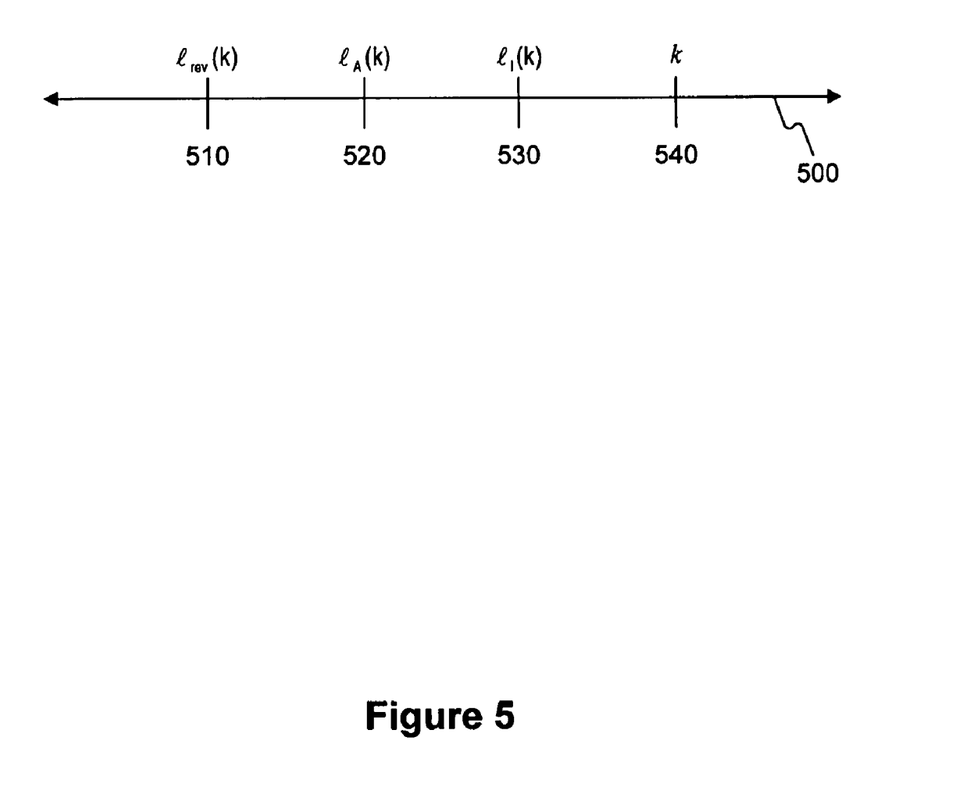
FIG. 5 depicts an advertising campaign timeline that may be used in predicting advertising revenue, consistent with embodiments of the present invention.

FIG. 5 depicts an advertising campaign timeline that may be used in predicting advertising revenue, consistent with embodiments of the present invention. As shown in FIG. 5, the passage of time during an advertising campaign, shown on timeline 500, may be divided into intervals for predicting revenue. These intervals may be determined by points in time chosen based on what campaign data is known and what data is unknown at a certain point in time. In certain embodiments, "known" data may in fact be highly accurate estimates of data provided by sensor 330.

In the embodiment of FIG. 5, the first point in time $l_{rev}(k)$, noted by reference number 510, marks the end of the most recent hour period for which cumulative revenue is "known," e.g., estimated to a high degree of accuracy. The "known" revenue of the advertising campaign up to and including time $l_{rev}(k)$ can be represented as:

$$\hat{r}_1^{cum}(k) = r^{cum}(l_{rev}(k))$$

As described above, this revenue may be received as an input to revenue predictor 340 from sensor 330.

The next point in time 520 may be a time at which volume data (for impressions, clicks, and actions) is known but revenue data has not yet been reported. This time may be described as $l_A(k)$. Thus, the second interval may be described as a running from a time just after $l_{rev}(k)$ to a point in time, $l_A(k)$. In this time interval, known volume data may be represented as follows:

$n_I(k)$ is the impression volume at time k;
$n_C(k)$ is the click volume at time k; and
$n_A(k)$ is the conversion, or action, volume at time k.

Furthermore, cost per event data for the advertising campaign may be represented as follows:

$\eta_I(k)$ is the cost per impression;
$\eta_C(k)$ is the cost per click; and
$\eta_A(k)$ is the cost per conversion, or action.

Although revenue in period $l_{rev}(k)$ to $l_A(k)$ is not known, it may be estimated using the following equation:

$$\hat{r}_2^{cum}(k) = \sum_{i=l_{rev}+1}^{l_A} ((\eta_I(i)n_I(i) + \eta_C(i)n_C(i) + \eta_A(i)n_A(i))$$

Thus, the revenue for the period of time depicted from 510 through 520 may be estimated by summing, from time $l_{rev}+1$ through time $l_A$, the known number of events times the cost per event for each of the three types of events (i.e., actions, impressions, and clicks). This calculation estimates revenue for the second interval on timeline 500, from a time just after $l_{rev}(k)$ through $l_A(k)$ using known volume data and known cost per event data.

In certain embodiments, it can be assumed that the cost per impression, cost per click, and cost per action are known values, but this is not always the case. For example, if a campaign is of the revenue-share type, then the cost per impression may be unknown, and an estimate of $\hat{\eta}_A(i)$ is used instead.

The next point in time $l_f(k)$, indicated by reference number 530, may be a time at which impression and click volumes are known but conversion (i.e., action) volume is not reliably known. Thus, the second interval may be described as running from a time just after $l_A(k)$ through $l_f(k)$. This interval may be very short or insignificant in certain campaigns, e.g., CPM or CPC campaigns where actions are not tracked or CPA campaigns with short lag. However, this time period may be critical to accurate revenue predictions in other campaigns, such as campaigns where volume and revenue dramatically change over the course of a few hours. Such sudden changes may be caused by, for example, human error or holiday effects. When such an event occurs, it is desirable to update predicted revenue calculations as soon as possible to enable controller 310 to act quickly.

Because conversion volume is not reliably known in this time period, revenue predictor 340 may use an estimated impression-to-conversion probability as part of predicting revenue for this time period. The estimated impression-to-conversion (or I2A) probability may be represented as $\hat{p}_{I2A}(k)$ for time k. In certain embodiments, this probability may be estimated using impression-to-conversion plant parameters $\hat{\Theta}_{I2A}$ received from plant estimator 320 for this advertising campaign. A skilled artisan will note that many different parametric and non-parametric models may be used to estimate the impression-to-conversion probability of an advertising campaign.

Based on the estimated impression-to-conversion probability $\hat{p}_{I2A}(k)$ and the known impression and click volumes, the revenue for the interval just after $l_A(k)$ through $l_f(k)$ may be predicted using:

$$\hat{r}_3^{cum}(k) = \sum_{i=l_A+1}^{l_f} ((\eta_I(i)n_I(i) + \eta_C(i)n_C(i) + \eta_A(i)n_I(i)\hat{p}_{I2A}(i))$$

Thus, the final term in this equation multiplies the number of impressions by the estimated probability that those impressions will result in actions, in order to predict the number of actions. In this way, the revenue for the period of time depicted from 520 through 530 may be estimated by summing, from time $L_A+1$ through time $l_f$, the known number of events times the cost per event for each of impressions and clicks, plus the cost per action times the predicted number of actions. This calculation estimates revenue for the third interval on timeline 500, from a time just after $l_A(k)$ through $l_f(k)$ using both known and predicted volume data.

In certain embodiments where plant parameters $\hat{\Theta}_{I2A}$ have not been received from plant estimator 320, $\hat{p}_{I2A}(i)$ cannot be determined and zero is substituted into the $\hat{r}_3^{cum}(k)$ equation in place of $\hat{p}_{I2A}(i)$. While such a substitution may result in a biased predicted revenue $\hat{r}_3^{cum}(k)$, this type of situation is most likely to occur in the initial stages of an advertising campaign, so it may be avoided by, for example, a pre-launch of the campaign or by using data from a related campaign.

The next time interval runs from time $l_I(k)$ through time k, i.e., the time for which revenue predictor 540 is to predict the cumulative revenue $\hat{r}^{cum}(k)$. During this time interval, depicted by reference numbers 530 through 540, no volume data is known. To predict volume data for this interval, revenue predictor 340 uses estimated plant parameters from plant estimator 320 to predict the number of impressions and clicks, as follows:

$\hat{\Theta}_I$ are the estimated plant parameters used to predict impression volume $\hat{n}_I(k)$; and $\hat{\Theta}_C$ are the estimated plant parameters used to predict click volume $\hat{n}_C(k)$.

A skilled artisan will note that many different parametric and non-parametric models may be used to estimate the click volume and/or impression volume of an advertising campaign. As in the previous time interval, conversion volume may be predicted using an impression-to-conversion probability $\hat{p}_{I2A}(k)$ based on impression-to-conversion plant parameters $\hat{\Theta}_{I2A}$ received from plant estimator 320.

Based on the estimated impression volume $\hat{n}_I(k)$, the estimated click volume $\hat{n}_C(k)$, and the estimated impression-to-conversion probability $\hat{p}_{I2A}(k)$, the revenue for the interval just after time $l_I(k)$ through time k may be predicted using:

$$\hat{r}_4^{cum}(k) = \sum_{i=l_I+1}^{k} ((\eta_I(i)\hat{n}_I(i) + \eta_C(i)\hat{n}_C(i) + \eta_A(i)\hat{n}_I(i)\hat{p}_{12A}(i))$$

The final term in this equation multiplies the estimated number of impressions by the estimated probability that impressions will result in actions, in order to predict the number of actions. In this way, the revenue for the period of time depicted from 530 through 540 may be estimated by summing, from time $l_I+1$ through time k, the predicted number of events times the cost per event for each of impressions, clicks, and actions.

In certain embodiments where plant parameters $\hat{\Theta}_{I2A}$, $\hat{\Theta}_I$, and/or $\hat{\Theta}_C$ have not been received from plant estimator 320, the corresponding term ($\hat{p}_{I2A}(i)$, $\hat{n}_I(k)$, and/or $\hat{n}_C(k)$) is replaced by zero in the $\hat{r}_4^{cum}(k)$ equation. While such a substitution may result in a biased predicted revenue $\hat{r}_4^{cum}(k)$, this situation would typically arise only for a short period of time, such as a four hour time window, when this term is of little significance to the overall revenue prediction.

Thus, to predict revenue of an advertising campaign at time k (540), revenue predictor 340 starts with known revenue at time $l_{rev}(k)$ (510), when revenue is "known," and then predicts revenue over the remaining time from $l_{rev}(k)$ until k by dividing the remaining time into intervals based on what data is known and what data is not known at certain points in time (520, 530). In certain embodiments, the total predicted revenue at time k can be determined by summing the predicted revenue in each interval, as follows:

$$\hat{r}_{prel}^{cum}(l_{rev}, l_I, l_C, l_A) = \hat{r}_{prel}^{cum}(k) = \hat{r}_1^{cum}(k) + \hat{r}_2^{cum}(k) + \hat{r}_3^{cum}(k) + \hat{r}_4^{cum}(k)$$

Figure 6:
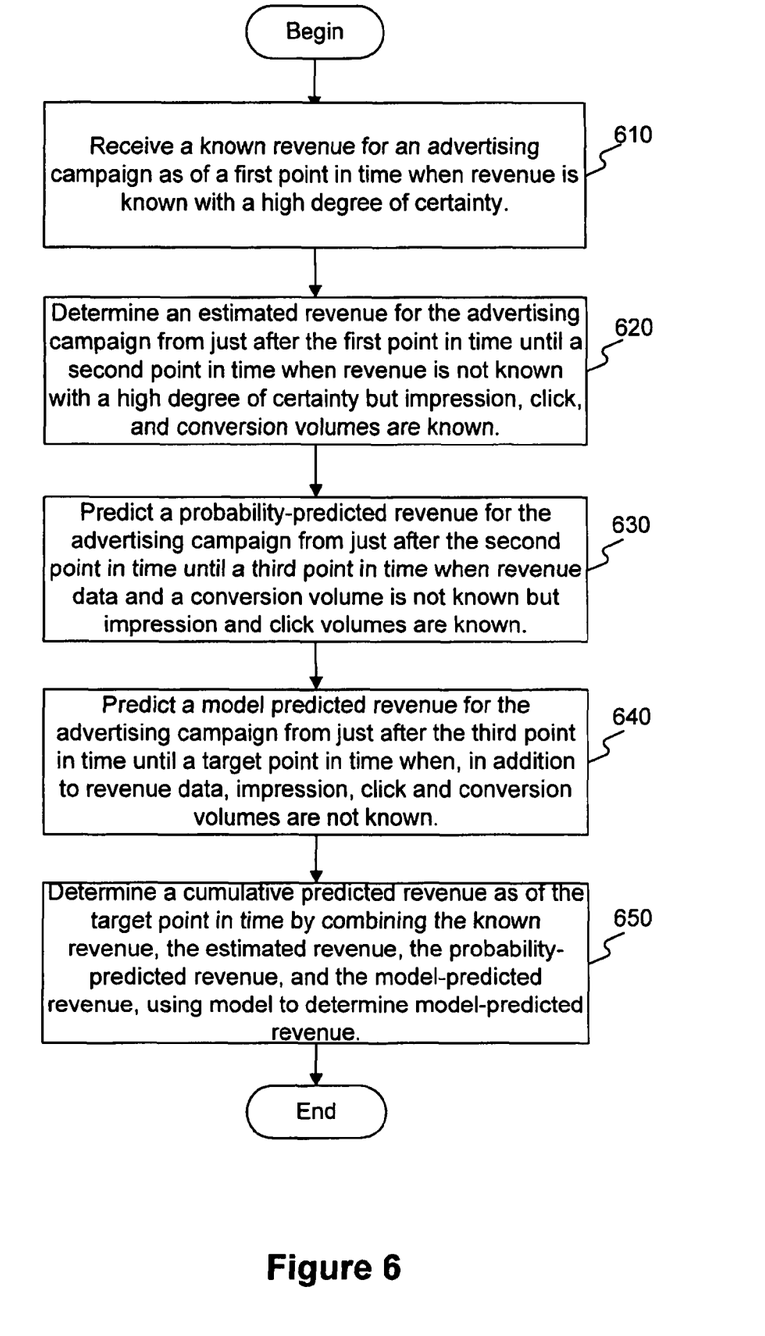
FIG. 6 is a flow chart depicting a process for predicting advertising revenue based on a plurality of intervals during the advertising campaign.

FIG. 6 is a flow chart depicting a process for predicting advertising revenue in this way. First, a known revenue $\hat{r}_1^{cum}(k)$, i.e., the cumulative revenue up to and including $l_{rev}(k)$ is received (step 610). In certain embodiments, $l_{rev}(k)$ is the end of the most recent hour period for which cumulative revenue is estimated to a high degree of accuracy. An estimated revenue $\hat{r}_2^{cum}(k)$ is determined for a time just after $l_{rev}(k)$ through time $l_A(k)$ (step 620). In certain embodiments, $l_A(k)$ is a time when all volume data are known but revenue data has not yet been reported. A probability-predicted revenue $\hat{r}_3^{cum}(k)$ is predicted for the period from a time just after $l_A(k)$ through time $l_I(k)$ (step 630). In certain embodiments, $l_I(k)$ is a time when click and impression volume data are known but conversion volume is not known. Also, a model-predicted revenue $\hat{r}_4^{cum}(k)$ is predicted for a time just after $l_I(k)$ through time k (step 640). Time k is a target point in time for predicting the advertising campaign revenue, e.g., the present time, when revenue and volume data are unknown. A cumulative predicted revenue $\hat{r}_{prel}^{cum}(k)$ is determined by combining the known revenue, the estimated revenue, the probability-predicted revenue, and the model-predicted revenue (step 650).

In most embodiments, the total predicted cumulative revenue $\hat{r}_{prel}^{cum}(k)$ will be greater than confirmed, or "uploaded" cumulative revenue $\hat{r}_{cum}^{uploaded}(k)$ received from sensor 330. This may happen because $\hat{r}_{prel}^{cum}(k)$ is based at least in part on estimated or predicted revenue-generating events that have not actually occurred yet. For example, as described above, $\hat{r}_{prel}^{cum}(k)$ may be calculated using an estimated impression-to-action probability and/or estimated click or impression volume data. Revenue predicted based on these events happening in the future will usually be greater than confirmed, uploaded revenue.

To improve the final revenue prediction, revenue predictor 340 may take into account the uploaded revenue $\hat{r}_{prel}^{uploaded}(k)$. Because uploaded revenue $\hat{r}_{prel}^{uploaded}(k)$ is confirmed revenue, it functions as a lower bound on $r^{cum}(k)$. Such a relationship may be represented by:

$$r^{cum}(k) \geq r_{cum}^{uploaded}(k)$$

Therefore, if the uploaded revenue $r_{cum}^{uploaded}(k)$ is already known to be greater than the predicted revenue resulting from the calculations described above, then revenue predictor 340 can replace the predicted revenue $\hat{r}_{prel}^{cum}(k)$ with the uploaded revenue $r_{cum}^{uploaded}(k)$ according to:

$$\hat{r}^{cum}(k|l_{rev}, l_I, l_C, l_A) = \max(\hat{r}_{prel}^{cum}(k|l_I, l_C, l_A)(k|l_{rev}, l_I, l_C, l_A), r_{uploaded}^{cum}(k))$$

In this way, revenue predictor 340 determines a final predicted cumulative revenue for an advertising campaign at time k. The final predicted revenue may enable controller 310 to determine a control signal to adjust the behavior of the advertising campaign.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A computer-implemented method for predicting revenue of an advertising campaign using a revenue predictor in a campaign control computer while the campaign is ongoing, comprising:

receiving, by a controller of the campaign control computer, a starting point in time, during the advertising campaign, when a starting revenue and volume data through the starting point in time were known;

receiving, by the controller, a target point in time, at which a cumulative predicted revenue is to be determined representing the cumulative revenue generated by the advertising campaign up to the target point in time;

dividing, by the controller, the time between the starting point in time and the target point in time into at least two intervals based on a selected point in time at which less than all of the starting revenue and the volume data were known;

computing, by the controller, an estimated revenue generated by the advertising campaign from a time just after the starting point in time until the target point in time;

computing, by the controller, a predicted revenue generated by the advertising campaign from a time just after the selected point in time until the target point in time; and determining, by the controller, the cumulative predicted revenue for the advertising campaign through the target point in time based on the starting revenue, the estimated revenue, and the predicted revenue.

2. The computer-implemented method of claim 1, wherein computing, by the controller, the estimated revenue further includes:

computing, by the controller, the estimated revenue using a known impression volume for the advertising campaign through the selected point of time and an estimated impression-to-click probability for the advertising campaign.

3. The computer-implemented method of claim 1, wherein computing, by the controller, the predicted revenue further includes:

computing, by the controller, the predicted revenue using volume models.

4. The computer-implemented method of claim 1, wherein the volume data includes at least one of an impression volume, a click volume, and an action volume.

5. The computer-implemented method of claim 1, wherein the starting revenue and the volume data through the starting point are considered to be known when they can be estimated to a predetermined accuracy.

6. The computer-implemented method of claim 1, further comprising:

determining, by the controller, a control signal based on the cumulative predicted revenue; and applying the control signal, by the campaign control computer, to adjust behavior of the advertising campaign.

7. The computer-implemented method of claim 1, further comprising:

determining, by the controller, a control signal based on the cumulative predicted revenue; and applying the control signal, by the campaign control computer, to alter placement of an advertisement during the advertising campaign.

8. A computer-implemented method for predicting revenue of an advertising campaign using a revenue predictor in a campaign control computer while the campaign is ongoing, comprising:

receiving, by a controller of the campaign control computer, a starting point in time, during the advertising campaign, when a starting revenue, click volume data, impression volume data, and conversion volume data through the starting point in time were known;

determining, by the controller, an estimated revenue for a portion of the advertising campaign from a time just after the starting point in time until a second point in time when the click volume data, the impression volume data, and the conversion volume data were known but the starting revenue was not known;

computing, by the controller, a probability-predicted revenue for a portion of the advertising campaign from a time just after the second point in time until a third point in time when the click volume data and the impression volume data were known but the conversion volume data and the starting revenue were not known;

computing, by the controller, a model-predicted revenue generated by the advertising campaign from a time just after the third point in time until a target point in time when click the volume data, the impression volume data, the conversion volume data, and the starting revenue are not known; and estimating, by the controller, a cumulative revenue for the advertising campaign through the target point in time by combining the starting revenue, the estimated revenue, the probability-predicted revenue, and the model-predicted revenue.

9. The computer-implemented method of claim 8, wherein estimating, by the controller, the cumulative revenue further includes:

estimating, by the controller, the cumulative revenue using an impression-to-click probability for the advertising campaign.

10. The computer-implemented method of claim 8, wherein computing, by the controller, the model-predicted revenue further includes:

computing, by the controller, the model-predicted revenue using volume models to predict the click volume data, the impression volume data, and the conversion volume data.

11. The computer-implemented method of claim 8, wherein data is considered to be known when it can be estimated to a predetermined accuracy.

12. The computer-implemented method of claim 8, further comprising:

determining, by the controller, a control signal based on the cumulative predicted revenue; and applying the control signal, by the campaign control computer, to adjust behavior of the advertising campaign.

13. The computer-implemented method of claim 8, further comprising:

determining, by the controller, a control signal based on the cumulative predicted revenue; and applying the control signal, by the campaign control computer, to alter placement of an advertisement during the advertising campaign.

14. A system for predicting revenue of an advertising campaign while the campaign is ongoing, comprising:

a campaign control computer; and a revenue predictor configured to execute a computer-implemented method, the computer-implemented method including:

receiving a starting point in time, during the advertising campaign, when a starting revenue and volume data through the starting point in time were known;

receiving a target point in time, at which a cumulative predicted revenue is to be determined representing a cumulative revenue generated by the advertising campaign up to the target point in time;

dividing the time between the starting point and the target point into at least two intervals based on a selected point in time at which less than all of the cumulative revenue and the volume data were known;

computing an estimated revenue generated by the advertising campaign from a time just after the starting point in time until the selected point in time;

computing a predicted revenue generated by the advertising campaign from a time just after the selected point in time until the target point in time; and determining the cumulative predicted revenue for the advertising campaign through the target point in time based on the starting revenue, the estimated revenue, and the predicted revenue.

15. The system of claim 14, wherein the computer-implemented method executed by the revenue predictor further includes:
computing the estimated revenue using a known impression volume for the advertising campaign through the selected point of time and an estimated impression-to-click probability for the advertising campaign.

16. The system of claim 14, wherein the computer-implemented method executed by the revenue predictor further includes:
determining the predicted revenue using volume models.

17. The system of claim 14, wherein the volume data includes at least one of an impression volume, a click volume, and an action volume.

18. The system of claim 14, wherein the starting revenue and the volume data through the starting point are considered to be known when they can be estimated to a predetermined accuracy.

19. The system of claim 14, wherein the campaign control computer is further configured to:
determine a control signal based on the cumulative predicted revenue; and
apply the control signal to adjust the behavior of the advertising campaign.

20. The system of claim 14, wherein the campaign control computer is further configured to:
determine a control signal based on the cumulative predicted revenue; and
apply the control signal to alter placement of an advertisement during the advertising campaign.

21. A computer-implemented method for predicting revenue of an advertising campaign using a revenue predictor in a campaign control computer while the campaign is ongoing, comprising:
receiving, by a controller of the campaign control computer, a starting point in time, during the advertising campaign, when a starting revenue and volume data through the starting point in time were known;
receiving, by the controller, a target point in time, at which a cumulative predicted revenue is to be determined representing the cumulative revenue generated by the advertising campaign up to the target point in time;
dividing, by the controller, the time between the starting point in time and the target point in time into at least two intervals based on a selected point in time at which less than all of the starting revenue and the volume data were known;
computing, by the controller, an estimated revenue generated by the advertising campaign from a time just after the starting point in time until the selected point in time;
computing, by the controller, a predicted revenue generated by the advertising campaign from a time just after the selected point in time until the target point in time;
determining, by the controller, the cumulative predicted revenue for the advertising campaign through the target point in time based on the starting revenue, the estimated revenue, and the predicted revenue; and
altering, by the controller, a placement of an advertisement during the advertising campaign based on the cumulative predicted revenue.

22. The computer-implemented method of claim 21, wherein computing, by the controller, the estimated revenue further includes:
computing, by the controller, the estimated revenue using a known impression volume for the advertising campaign through the selected point of time and an estimated impression-to-click probability for the advertising campaign.

23. The computer-implemented method of claim 21, wherein computing, by the controller, the predicted revenue further includes:
computing, by the controller, the predicted revenue using volume models.

24. The computer-implemented method of claim 21, wherein the volume data includes at least one of an impression volume, a click volume, and an action volume.

25. A computer-implemented method for predicting revenue of an advertising campaign using a revenue predictor in a campaign control computer while the campaign is ongoing, comprising:
receiving, by a controller of the campaign control computer, a starting point in time, during the advertising campaign, when a starting revenue and volume data through the starting point in time were known;
receiving, by the controller, a first target point in time, at which a first cumulative predicted revenue is to be determined representing the cumulative revenue generated by the advertising campaign up to the target point in time;
receiving, by the controller, a second target point in time, at which a second cumulative predicted revenue is to be determined representing the cumulative revenue generated by the advertising campaign up to the target point in time;
computing, by the controller, a first estimated revenue generated by the advertising campaign from a first time just after the starting point in time until the first target point in time;
computing, by the controller, a second estimated revenue generated by the advertising campaign from a second time just after the starting point in time until the second target point in time;
computing, by the controller, a first predicted revenue generated by the advertising campaign from the first time just after the selected point in time until the first target point in time;
computing, by the controller, a predicted revenue generated by the advertising campaign from a second time just after the selected point in time until the second target point in time;
determining, by the controller, the first cumulative predicted revenue for the advertising campaign through the first target point in time based on the starting revenue, the first estimated revenue, and the first predicted revenue;
determining, by the controller, the second cumulative predicted revenue for the advertising campaign through the second target point in time based on the starting revenue, the second estimated revenue, and the second predicted revenue;
altering, by the controller, a placement of a first advertisement of the advertising campaign based on the first cumulative predicted revenue; and
altering, by the controller, a placement of a second advertisement of the advertising campaign based on the second cumulative predicted revenue.

26. The computer-implemented method of claim 25, wherein the volume data includes at least one of an impression volume, a click volume, and an action volume.

* * * * *